(No Model.)  2 Sheets—Sheet 1.
H. WIEDLING.
PIPE COUPLING.
No. 347,855.  Patented Aug. 24, 1886.
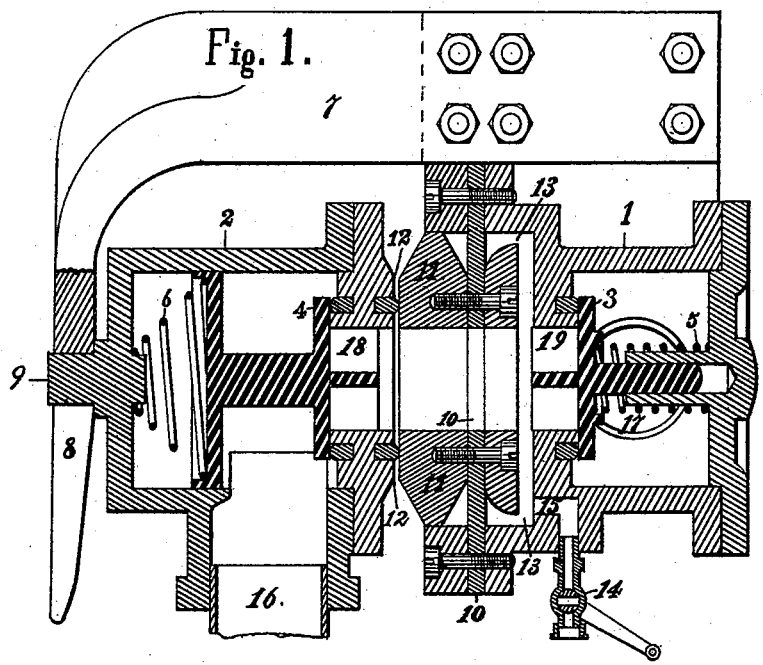
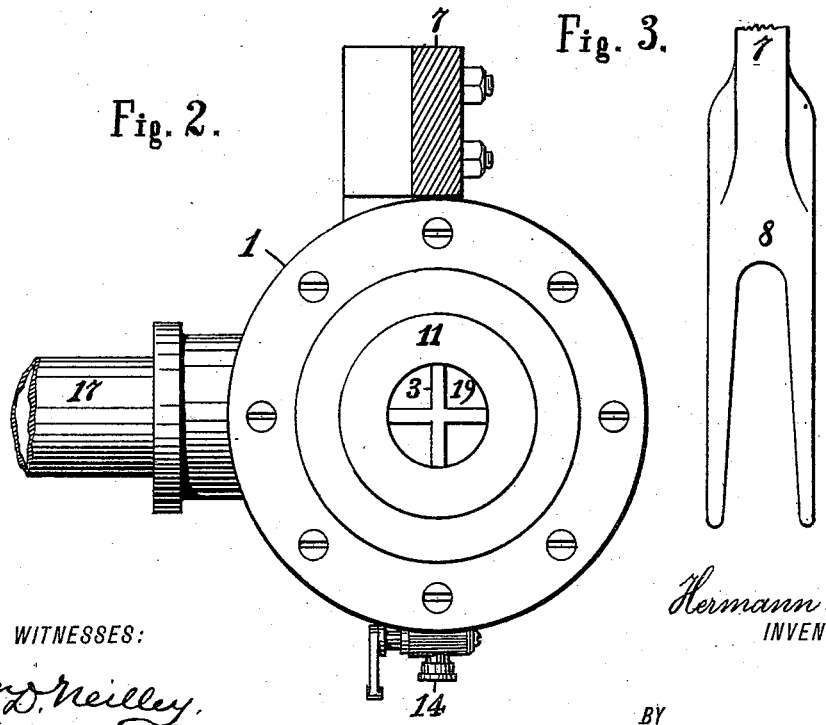
WITNESSES:
Hermann Wiedling
INVENTOR
BY
ATTORNEY (No Model.) 2 Sheets—Sheet 2.

H. WIEDLING.
PIPE COUPLING.

No. 347,855. Patented Aug. 24, 1886.

ATTEST
J. A. Murdle
Wm D. Nulley

INVENTOR:
Hermann Wiedling
By Foster & Wilson
Attorneys.

N. PETERS, Photo-Lithographer, Washington, D. C.

United States Patent Office.

HERMANN WIEDLING, OF NEW YORK, N. Y., ASSIGNOR, BY DIRECT AND MESNE ASSIGNMENTS, TO THE WIEDLING MOTOR COMPANY, OF SAME PLACE.

PIPE-COUPLING.

SPECIFICATION forming part of Letters Patent No. 347,855, dated August 24, 1886.

Application filed August 21, 1885. Serial No. 174,929. (No model.)

*To all whom it may concern:*

Be it known that I, HERMANN WIEDLING, a citizen of the Empire of Germany, residing at the city, county, and State of New York, have invented certain new and useful Improvements in Pipe-Couplings, of which the following is a specification.

My invention relates to pipe couplings, which will be automatically locked when the coupling-heads have been connected by the pressure of the fluid passing through the pipe, as hereinafter more specifically stated.

Figure 4:
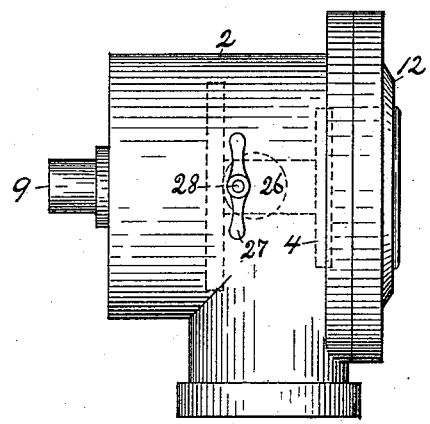
Figure 5:
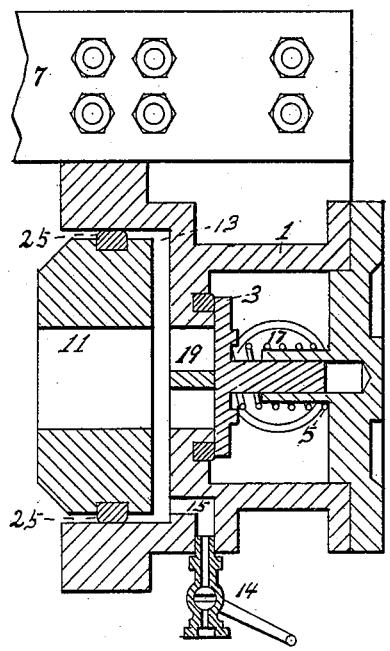

In the drawings, Figure 1 is a longitudinal sectional view of my invention, showing the coupling-heads connected. Fig. 2 is a face view of coupling-head 1, with the forked arm broken off, taken at right angles to Fig. 1. Fig. 3 is a view of the forked arm of coupling-head 1, also taken at right angles to Fig. 1. Fig. 4 shows method of opening the valve 4 by means of an eccentric. Fig. 5 shows modification of coupling-head.

Similar numbers designate similar parts in all the drawings.

1 and 2 are the coupling-heads, which may have the valves 3 and 4 kept to their seats by springs 5 and 6. The coupling-head 1 has the arm 7, which ends in a fork, 8, forming a support for the central guide-pin, 9, of coupling-head 2.

10 is a diaphragm, of rubber or other suitable flexible material, in the front of coupling-head 1, and to which is fastened the annular face-plate 11, which connects with the annular face 12 of coupling-head 2.

13 is a space between the diaphragm 10 and the coupling head, out of which runs a small channel, 15, controlled by the valve 14. Any suitable valve or cock may be used for this purpose.

16 is the inlet-pipe of coupling-head 2, and 17 is the outlet-pipe for coupling-head 1.

The operation of my invention is as follows: The coupling-heads being separated to connect them, the pin 9 of coupling-head 2 is guided into fork 8 of coupling-head 1 until it comes into the axis of the annular face-plate 11 of coupling-head 1, when the faces of the coupling-heads will be in contact and the valve-channel 18 of valve 4 will be opposite to the channel 19 of valve 3. The small valve 14 is then closed, and remains so, and the main inlet-valve 4 is opened, (any suitable device being used for that purpose,) when the pressure from pipe 16 enters through valve-channels 18 19 into the space 13, forces out the diaphragm 10, which presses the annular joint-ring 11 against the annular joint 12 of coupling-head 2 so tightly that no fluid can escape from between them. As soon as the pressure in space 13 rises above that in pipe 17 the disk-valve 3 is lifted against its spring 5, and the fluid will flow from pipe 16 to pipe 17, the coupling being held together by the pressure of the fluid in space 13. When it is desired to disconnect the coupling, the admission-valve 4 is first closed. The check-valve 3 in coupling-head 1 will then close automatically by its spring 5, leaving a certain amount of fluid under pressure in valve-chambers 18 and 19 and space 13. If the coupling-heads are then separated, this fluid will expand rapidly with a loud noise. To prevent this, the small valve 14 is opened before the coupling-heads are disconnected and the fluid allowed to escape through a waste-pipe, which may be attached to valve 14.

It is obvious that the object of the diaphragm 11 is to allow a movement of face-plate 11, while at the same time an air-tight joint is made behind it. A similar result might be obtained by dispensing with the diaphragm 10 and packing the face-plate 11 so that it would play like a piston in an air-tight chamber in coupling-head 1, and so that when the pressure is let in behind it it would be driven forward against the coupling-head 2. (See Fig. 5.)

My object is to form a coupling-head with a movable face-plate, which will be driven forward against the face-plate of the other coupling-head by the pressure of the fluid in the coupling. It is also obvious that the coupling may be used for steam, gas, air, water, or other suitable fluid under pressure, and I do not claim it specifically for any particular fluid.

My invention also may be adapted to exhaust-pipes, in which case the coupling will be tightly closed by the pressure of the outer air. This would be an obvious modification of the device shown; but What I do claim, and desire to secure by Letters Patent of the United States, is—

1. The combination, with the coupling-head 2, provided with a channel, 16 18, for the passage of fluid, and an annular face-plate, 12, of the coupling-head 1, provided with the valve 3, a channel, 19 17, for the passage of fluid, the space or chamber 13, a movable connecting face-plate, 11, and a supporting-arm, 7, to hold the coupling-head 2 in place, substantially as and for the purposes set forth.

2. The combination, with the coupling-head 2, provided with a channel, 16 18, for the passage of fluid, and an annular face-plate, 12, of the coupling-head 1, provided with the channel 19 17, for the passage of fluid, a space or chamber, 13, a flexible diaphragm, 10, a connecting face-plate, 11, a valve, 3, and a supporting-arm, 7, to hold the coupling-head 2 in place, substantially as and for the purposes set forth.

3. The combination, with the coupling-head 2, provided with a channel, 16 18, for the passage of fluid, and an annular face-plate, 12, of the coupling-head 1, provided with a valve, 3, a channel, 19 17, for the passage of fluid, a space or chamber, 13, a channel, 15, a movable face-plate, 11, a valve, 14, and a supporting-arm, 7, to hold the coupling-head 2 in place, substantially as and for the purposes set forth.

4. The combination, with the coupling-head 2, provided with a channel, 16 18, for the passage of fluid, a valve, 4, and an annular face-plate, 12, of the coupling-head 1, provided with a channel, 19 17, for the passage of fluid, a valve, 3, a space or chamber, 13, a movable connecting face-plate, 11, and a channel, 15, valve 14, and supporting-arm 7, to hold the coupling-head 2 in place, substantially as and for the purposes set forth.

5. The combination, with the coupling-head 2, provided with the channel 16 18 for the passage of fluid, a valve, 4, and an annular face-plate, 12, of the coupling-head 1, provided with a channel, 19 17, for the passage of fluid, a space or chamber, 13, a movable connecting face-plate, 11, a valve, 3, and a supporting-arm, 7, to hold the coupling-head 2 in place, substantially as and for the purposes set forth.

6. The combination, in a pipe-coupling, of the coupling-head 2, provided with the valve 4, pin 9, and face-plate 12, and the coupling-head 1, provided with the arm 7, fork 8, valve 3, space 13, diaphragm 10, and movable connecting face-plate 11, substantially as and for the purposes set forth.

7. The combination, in a pipe-coupling, of coupling-head 2, provided with the valve 4, pin 9, and face-plate 12, and the coupling-head 1, provided with the arm 7, fork 8, valve 3, space 13, diaphragm 10, movable connecting face-plate 11, channel 15, and valve 14, substantially as and for the purposes set forth.

HERMANN WIEDLING.

Witnesses:
JAMES P. FOSTER,
MIRON WINSLOW.